April 19, 1938.  N. SCHWARTZ  2,114,358
FILTER TYPE RESPIRATOR
Filed Feb. 6, 1937
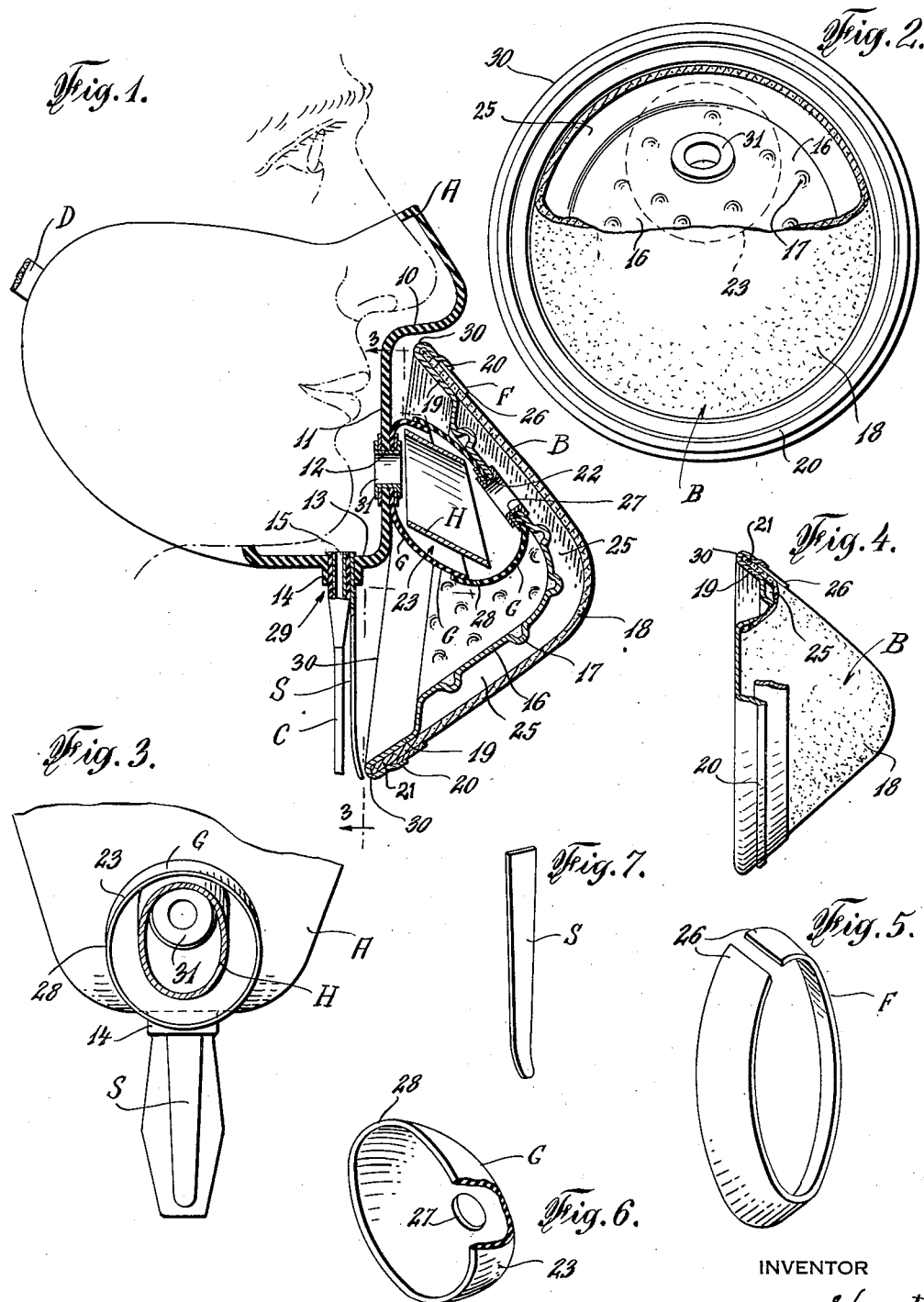
INVENTOR
Nathan Schwartz Patented Apr. 19, 1938

2,114,358

UNITED STATES PATENT OFFICE 2,114,358

FILTER TYPE RESPIRATOR

Nathan Schwartz, New York, N. Y.

Application February 6, 1937, Serial No. 124,372

9 Claims. (Cl. 128—146)

This invention relates to filter type respirators adapted to cover the nose and mouth of the wearer for the purpose of protection against dust, fumes and injurious gases, and is a modification of my copending application for Letters Patent filed January 25, 1937, Serial No. 122,169.

The invention broadly aims to improve the method of connecting the filter unit with the face piece of the respirator, and also in the construction of the filter unit in a manner whereby a large filtration area is provided in a limited space, and also in improving the means for securing the filter material edges at its attachment.

More particularly the invention resides in the construction of a filter unit having a substantially cup shaped or a substantially conical shaped frame wall which has undulations distributed for the purpose of spacing the filter material from the said wall. The filter material is substantially conforming in configuration to the said frame wall and thereby a large filter area is provided in a small circumferential space.

Another feature is to firmly secure the said filter material at its marginal attachment and this is done by providing a marginal rim washer support for the said filter material. In this type of filter unit a firm and secure attachment is important because the filter unit is in an anterior projecting position and therefore it may be accidentally touched and thereby loosened at its attachment.

Another feature is to provide a supporting strip of metal for the purpose of providing support to the filter unit at its lower end.

Another feature is to provide a suitable air conduit for attaching and connecting the said filter unit to the said face piece.

Another feature is the location of the filter unit at a set back portion below the nose line and also in a downward tilt of the said filter unit whereby the vision radius of the wearer remains unobstructed when wearing the respirator.

With the above recited and other objects in view, reference is had to the following description and the accompanying drawing in which there is exhibited one example or embodiment of the invention, while the claims define the actual scope of the same.

In the drawing:

Figure 1 is a section of the improved respirator in applied position.

Figure 2 is a front view of the separator partly broken.

Figure 3 is a section on line 3—3 of Figure 1.

Figure 4 is an outside view of the separator, partly broken.

Figure 5 is a perspective view of the metal washer support for the edges of the filter material.

Figure 6 is a perspective of the substantially cup shaped air conduit.

Figure 7 illustrates the metal support or stopper for the separator.

Referring to the drawing by characters of reference A designates the face piece, B the filter unit or separator, C the valve, D the head band, F the washer support for the edges of the filter material, G the connecting frame conduit, H the tubular supporting element for the flexible conduit, S the stopper support for the filter unit.

The face piece A has a set back below the nose line, which set back has a horizontal wall 10, and a vertical wall 11. The vertical wall has an aperture 12. Below the chin line is another set back 13, which has a depending boss 14, and an aperture 15 located within the said depending boss and the corresponding wall 13.

The filter unit B has a frame wall 16, which is substantially cup or conical shaped, and the said shape makes it possible to provide a large filter area in a limited space. That is, in order to provide a large filter area to make respiration easy it has been necessary to provide two filter units at each side of the face piece which was bulky and inconvenient for the wearer. In the improved respirator as herein disclosed, one such filter unit provides the necessary filter area. In other words the shape provides the means to create as large a filter area in one unit as were provided heretofore in two units.

The frame wall 16 has undulations 17, to provide spacing means for the filter material 18, and the said frame wall has a marginal rim 19 which has a forwardly directed flange 20. Groove 21 is formed between the said flange and the said rim. The outer wall being the flange 20 and the inner wall the rim 19. Filter material 18 is inserted into groove 21 and a resilient or deformable washer F preferably of metal or an equivalent material is secured between the said filter material and the outer or anterior wall for the purpose of providing a detachable connection and also a leak proof connection. It is to be noted that by the term, leak proof, as herein used we mean, secured against the passage of unfiltered air.

The frame wall 16 has an aperture 22 which is a means of connection with an air duct or conduit 23. There is an air space 25, between the filter material 18 and the frame wall 16. The apex of the filter unit B is tilted downward to avoid any possible obstruction to downward vision.

The marginal edge 30 of the frame wall 16 at its lower portion is supported by means of a supporting element S, which is preferably of light aluminum metal or its equivalent and it is adhesively attached in a space provided between the depending boss 14 and the proximal end 29 of the exhaust valve C.

The washer F is made of resilient metal or an equivalent material and has open ends 26 and is substantially conforming in configuration to the groove 21 and it is inserted after the filter material and is forced to locate between the filter material 18 and the flange wall 20 and its object is to provide a leak proof joint.

A substantially cup shaped rubber element G is provided and an aperture 27 made therein, which connects by means of eyelet 31 with the aperture 22. Also a similar shaped element is connected with the aperture 15 and in a similar manner. The two rubber elements are then adhesively united at their margins 28 in overlapping positions as illustrated in Figure 1. The two create an air duct or conduit and establish communication between the face piece and the separator for the passage of filtered air to the face piece.

A tubular supporting element H preferably of light aluminum is provided in the air conduit, for the purpose of maintaining the same in position and also patent.

An exhaust valve of the usual army gas mask type is provided and attached adhesively in the aperture 15 and in the depending tubular boss 14. That is the proximal end of the said valve has inserted an aluminum metal tube to keep same open and then the rubber valve is inserted at the said end into the said boss and wall opening and adhesively attached thereat.

It is to be noted that the method of inserting the supporting washer F is as follows: the two free ends 26 are overlapped then inserted into the proper position as explained above after insertion the ends 26 are coapted in line and thereby increasing its circumferential size and therefore it causes a fastening in the joint. Also the insertion is simplified by the ends being free, due to the difference in circumferential size of the outer and inner rims.

Having thus described my invention I claim as new and desire to secure by Letters Patent as follows:

1. A respirator including a face piece having an intake port, a filter unit having a substantially cup shaped frame wall with an outlet port and marginal means and filter material, and the said filter material is substantially conforming in configuration to the said frame wall and is removably secured at its edges to the margin of the said wall by the said means and the said filter material is confronting the said wall and in spaced relation therewith, and an air conduit connecting respectively with the intake and outlet ports and thereby establishing communication between the face piece and the filter unit.

2. A respirator including a face piece connected with a filter unit having a substantially cup shaped frame wall, filter material conforming substantially to the configuration of the said wall, and marginal means for removably securing the edges of the said filter material at the margin of the said frame wall, and the said filter material is in confronting relation to the said wall and spaced therefrom.

3. A respirator including a face piece having an inlet port, a filter unit having a frame wall with an outlet port, an air conduit connecting the said inlet and outlet ports respectively and establishing communication therebetween, and a supporting strip attached to the lower portion of the face piece and disposed rearward to the said frame wall and supplying support thereto at the lower portion thereof.

4. A respirator including a face piece having an inlet port, a filter unit having a substantially cup shaped frame wall with an outlet port and filter material of a similar configuration, a flexible air conduit connecting the said inlet and outlet ports respectively and establishing communication therebetween and a supporting tubular element contained in the said conduit.

5. A respirator including a face piece having a set back portion below the nose line, connected to a filter unit having a substantially cup shaped frame wall with a filter pad of similar configuration and the said filter unit is located at the said set back portion.

6. A respirator including a face piece having a set back portion below the nose line, connected to a filter unit having a substantially coned shaped frame wall and the said filter unit is located at the said set back portion and the apex of said cone is tilted downward.

7. A respirator including a face piece connected to a filter unit having a substantially cone shaped frame wall with a filter pad of similar configuration and the apex of the said cone is tilted downward.

8. A respirator including a face piece connected to a filter unit having a substantially cone shaped frame wall and the said filter unit is in confronting relation to the said face piece and apex of the said cone is tilted downward.

9. A filter unit for filter type respirators having an inlet port including a substantially cup shaped frame wall with marginal means for removably securing filter material thereat, comprising an inwardly opening groove disposed at the margin of the said wall and a displaceable washer support for the said filter material inserted between the said filter material and a wall of the said groove.

NATHAN SCHWARTZ.